United States Patent
Dawkins et al.

(10) Patent No.: US 8,145,932 B2
(45) Date of Patent: Mar. 27, 2012

(54) SYSTEMS, METHODS AND MEDIA FOR REDUCING POWER CONSUMPTION IN MULTIPLE CONTROLLER INFORMATION HANDLING SYSTEMS

(75) Inventors: William Price Dawkins, Jonestown, TX (US); Gary Benedict Kotzur, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 838 days.

(21) Appl. No.: 12/164,105

(22) Filed: Jun. 30, 2008

(65) Prior Publication Data

US 2009/0327780 A1    Dec. 31, 2009

(51) Int. Cl.
G06F 1/00 (2006.01)
G06F 1/26 (2006.01)
G06F 1/32 (2006.01)
G06F 11/00 (2006.01)
G06F 11/16 (2006.01)

(52) U.S. Cl. ....... 713/323; 713/300; 713/320; 714/6.21; 714/6.22

(58) Field of Classification Search ........................ None
See application file for complete search history.

(56) References Cited

U.S. PATENT DOCUMENTS

| | | | | |
|---|---|---|---|---|
| 6,085,332 A * | 7/2000 | El-Batal | ...... | 714/5.11 |
| 6,675,258 B1 * | 1/2004 | Bramhall et al. | ...... | 711/114 |
| 6,874,100 B2 * | 3/2005 | Rauscher | ...... | 714/6.21 |
| 6,961,815 B2 | 11/2005 | Kistler et al. | | |
| 7,120,911 B1 * | 10/2006 | Katayama | ...... | 718/102 |
| 7,373,456 B2 * | 5/2008 | Yamazaki et al. | ...... | 711/114 |
| 2005/0289368 A1 * | 12/2005 | Chang et al. | ...... | 713/300 |
| 2007/0079063 A1 * | 4/2007 | Mizuno | ...... | 711/112 |
| 2007/0091497 A1 * | 4/2007 | Mizuno et al. | ...... | 360/51 |
| 2008/0120463 A1 * | 5/2008 | Ashmore | ...... | 711/114 |
| 2008/0201616 A1 * | 8/2008 | Ashmore | ...... | 714/57 |
| 2008/0244295 A1 * | 10/2008 | Mizuno | ...... | 713/324 |
| 2009/0006876 A1 * | 1/2009 | Fukatani et al. | ...... | 713/320 |

* cited by examiner

*Primary Examiner* — Ji H Bae
(74) *Attorney, Agent, or Firm* — Garrana Tran LLP; Andrea E. Tran

(57) ABSTRACT

An information handling system (IHS) provides a method for conserving power. The method includes monitoring at least one performance characteristic of the IHS and determining if the at least one performance characteristic is below a low performance threshold. If the at least one performance characteristic is below the low performance threshold, a first controller is switched into a low power mode, wherein a first set of logical unit numbers (LUNs) are reassigned to a second controller.

18 Claims, 4 Drawing Sheets

SYSTEMS, METHODS AND MEDIA FOR REDUCING POWER CONSUMPTION IN MULTIPLE CONTROLLER INFORMATION HANDLING SYSTEMS

BACKGROUND

1. Technical Field

The present disclosure relates generally to the field of information handling and storage systems. More specifically, but with limitation, the disclosure relates to improving power consumption in storage systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a network of information handling systems (IHSs), one or more of the IHSs may be designed for data management and may include multiple storage devices. According to some studies, storage devices may account for more than 30% of the energy used by information technology (IT) equipment in datacenters. Consequently, there is significant interest in reducing the amount of energy used by storage devices. In an IHS containing several storage devices, a controller may be utilized to manage the storage devices. While version 1.0 of the Storage Bridge Bay (SBB) specification allowed controllers to use up to 100 W, version 2.0 of the SBB specification may allow controllers to use up to 200 W. It appears likely that the next generation of redundant array of independent/individual disk (RAID) controllers may use more power than previous controllers.

One feature that may be present in external storage systems is dual redundant RAID controllers. Since demanded uptime or availability on external storage systems may at times be high, both controllers may be powered on at all times. For instance, a RAID storage system may operate two controllers in an "active-standby" configuration. Each RAID controller may be responsible for servicing the input/output requests of one or more servers and may be a standby or backup controller for other servers. If one of the RAID controllers fails, the other RAID controller may become responsible for satisfying the requests of the failed controller. An "active-standby" configuration may allow data in the RAID storage system to be accessed without interruption even if one of the RAID controllers fails. However, by providing a high level of uptime or availability, power efficiency in the storage system may be decreased.

Thus, a need exists for methods, systems, and media that allow one or more controllers in a multiple controller system to be dynamically placed in a low power state during periods of low system utilization and brought back online during periods of high demand.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for conserving power in an information handling system (IHS). The method includes monitoring at least one performance characteristic of the IHS and determining if the at least one performance characteristic is below a low performance threshold. If the at least one performance characteristic is below the low performance threshold, a first controller is switched into a low power mode, wherein a first set of logical unit numbers (LUNs) are reassigned to a second controller.

Another aspect of the disclosure provides a computer-readable medium having computer-executable instructions for performing a method for conserving power in an information handling system (IHS). The method includes monitoring at least one performance characteristic of the IHS and determining if the at least one performance characteristic is below a low performance threshold. If the at least one performance characteristic is below the low performance threshold, a first controller is switched into a low power mode, wherein a first set of logical unit numbers (LUNs) are reassigned to a second controller.

Yet another aspect of the disclosure provides an information handling system (IHS) for reducing power consumption. The system includes a plurality of disks and a first controller in communication with the plurality of disks. The IHS monitors at least one performance characteristic and determines if the at least one performance characteristic is below a low performance threshold. If the at least one performance characteristic is below the low performance threshold, the first controller is switched into a low power mode. The system also includes a second controller in communication with the plurality of disks, wherein a first set of logical unit numbers (LUNs) are reassigned to the second controller.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable media are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a device" refers to one or several devices, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
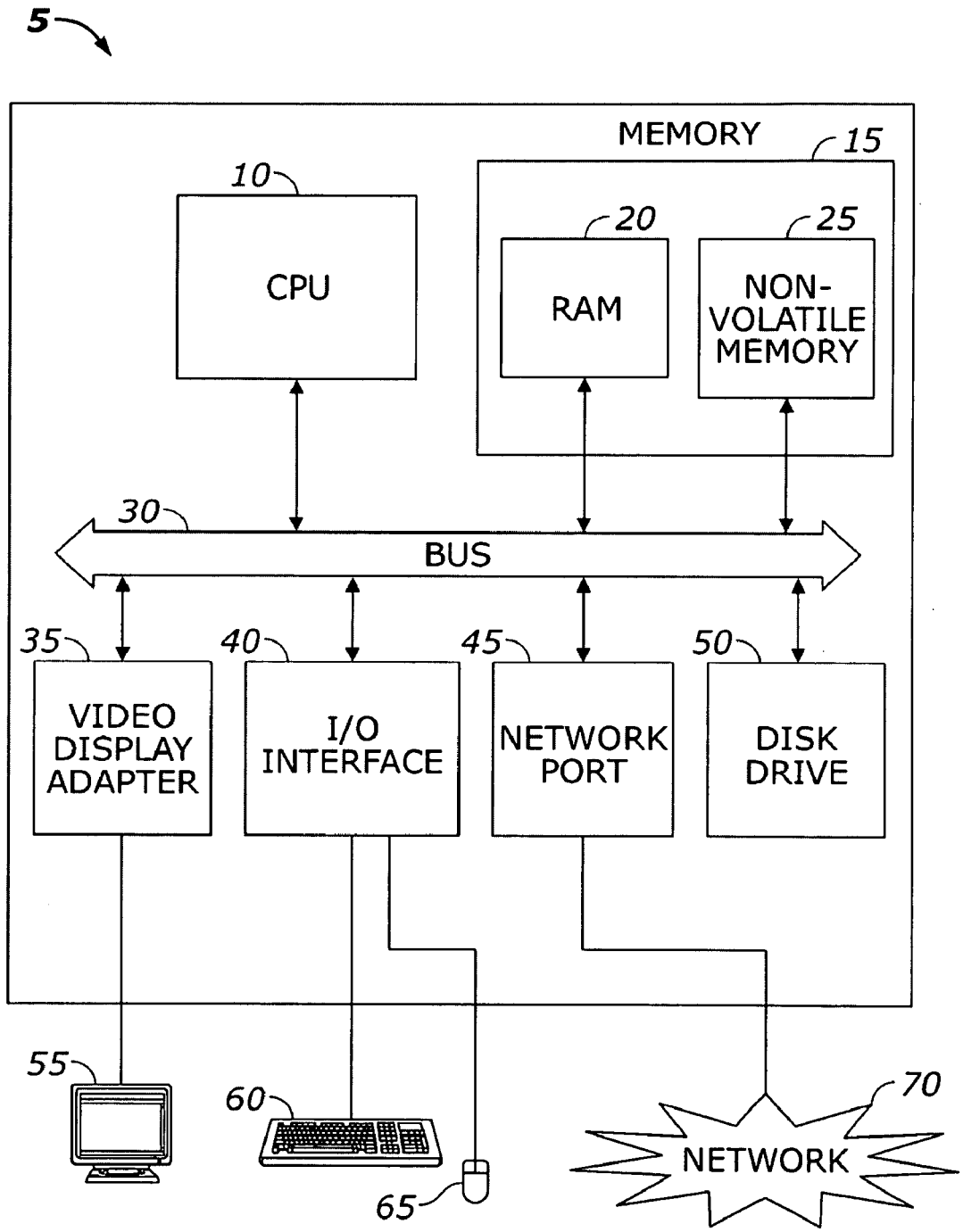
FIG. 1 represents an illustrative schematic of an information handling system (IHS) in accordance with the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
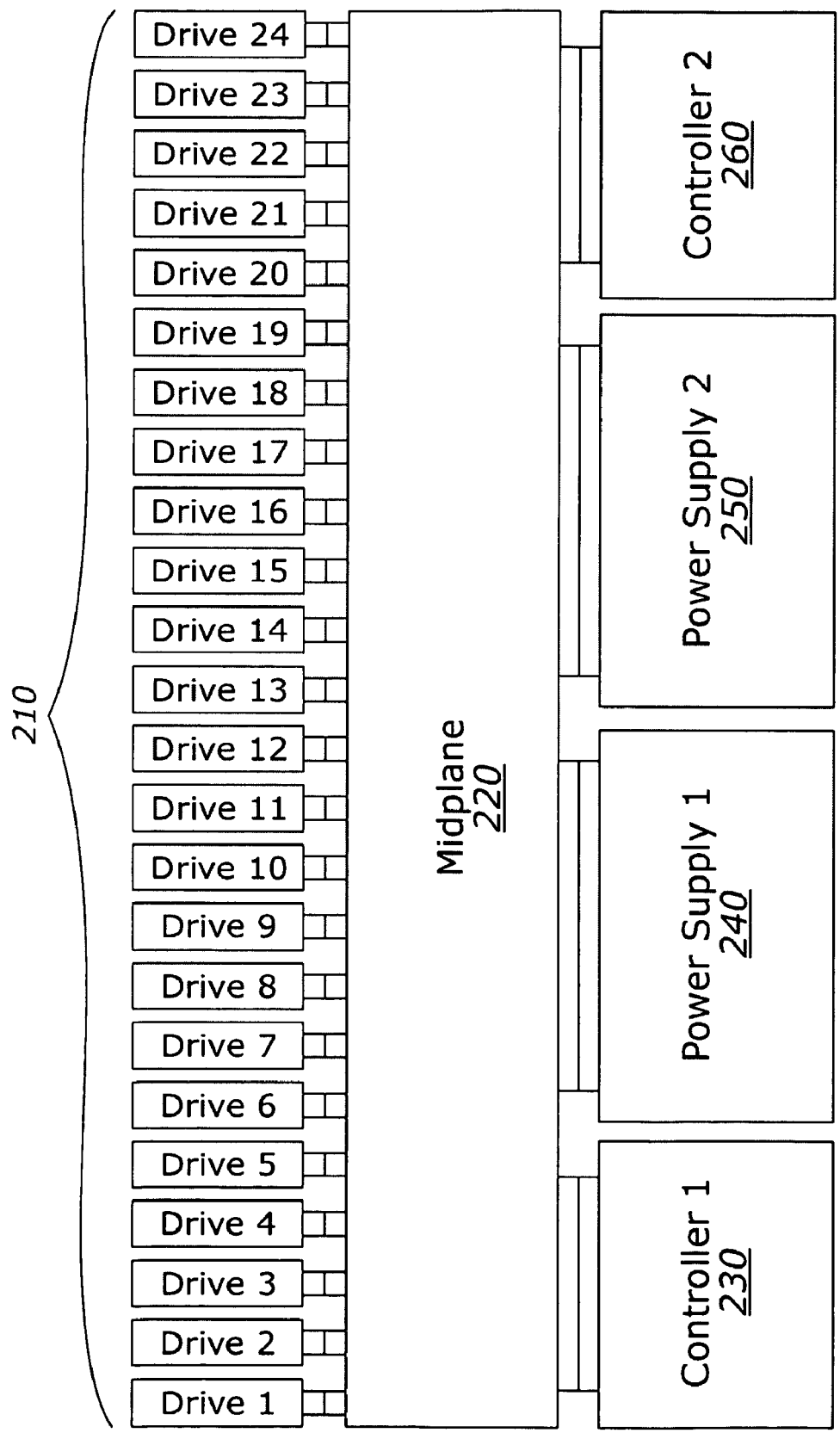
FIG. 2 provides an illustrative implementation of a disk subsystem utilizing dual controllers.

FIG. 2 provides an illustrative implementation of a disk subsystem utilizing dual controllers. A disk subsystem may include an array of several hard disk drives (HDD) 210, which may allow improved data reliability and input/output performance. For example, techniques such as copying data to more than one disk (i.e., mirroring), spreading data across more than one disk (i.e., striping), and storing redundant data so that errors may be detected and corrected if possible (i.e., error correction) may be utilized in a redundant array of independent/individual disk (RAID) to improve performance in a disk subsystem. A midplane 220 may be coupled to a first controller 230, a first power supply 240, a second power supply 250, and a second controller 260, which may provide power and control signals in the disk subsystem. The array of HDDs 210 may be coupled to the midplane 220 as well so that power and control signals may be routed to the HDDs 210.

Figure 3:
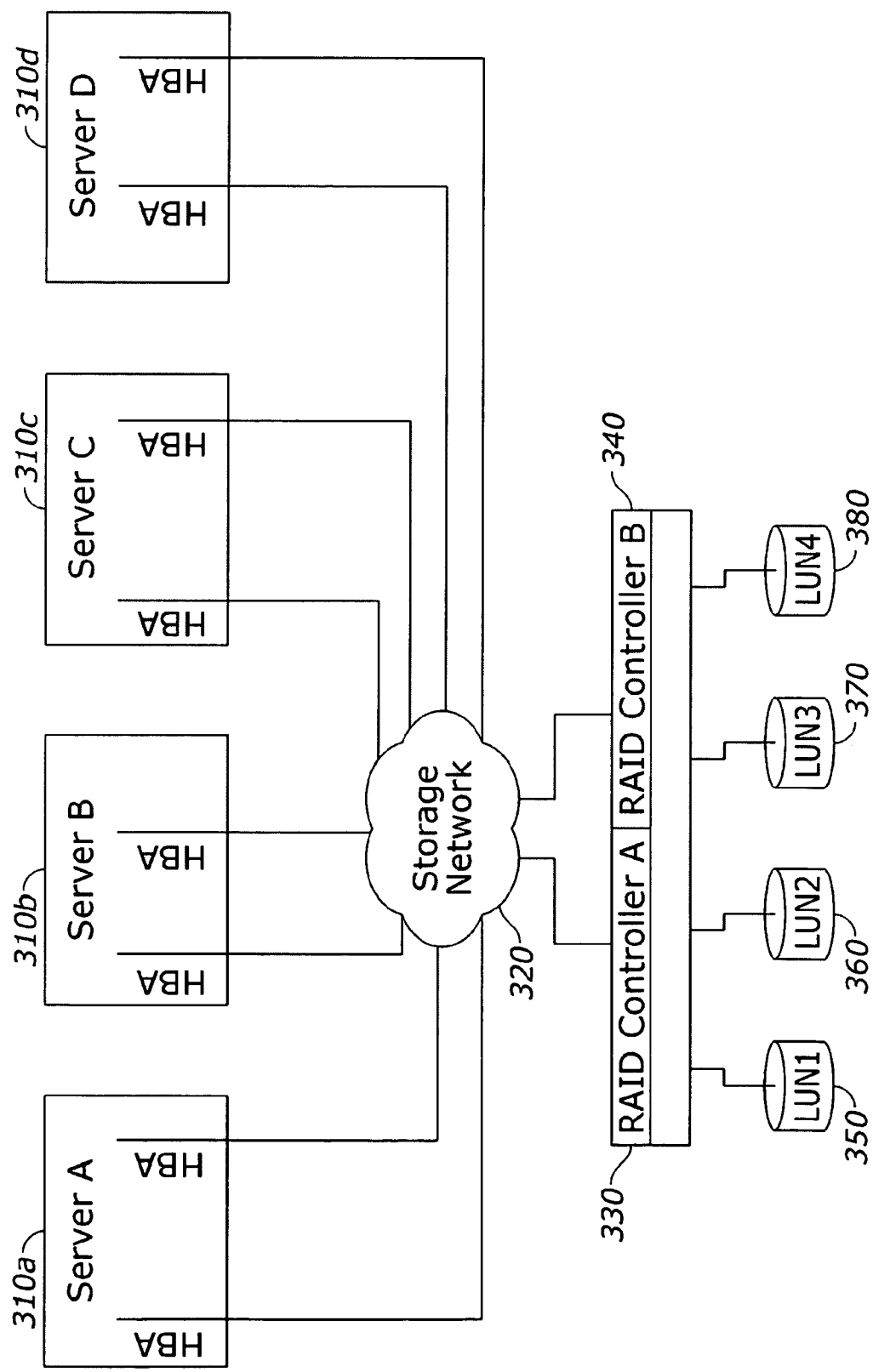
FIG. 3 provides an illustrative implementation of a storage network utilizing dual RAID controllers.

FIG. 3 provides an illustrative implementation of a storage network utilizing dual RAID controllers. A storage network may include multiple servers 310a-d that are coupled to a RAID controller A 330 and a RAID controller B 340 through a storage network 320 utilizing host bus adapters (HBAs) or host adapters (HAs), which may provide redundant data paths to a storage subsystem. A logical unit number (LUN) is a unique address or identifier that may be provided for a logical unit. A logical unit may represent a storage entity which may include a portion of storage device, an entire storage device, or several storage devices. Each server 310 in the storage network may be assigned a LUN. For example, Server A may be assigned LUN 1 350, Server B may be assigned LUN 2 360, Server C may be assigned LUN 3 370, and Server D may be assigned LUN 4 380.

In one implementation, a storage network may place the RAID controller A 330 and the RAID controller B 340 in an "active-standby" configuration where both controllers may be in a normal operating mode. RAID controller A 330 may be responsible managing the operations of LUN 1 350 and LUN 2 360, and RAID controller B 340 may be responsible managing the operations of LUN 3 370 and LUN 4 380. Further, RAID controller A 330 may serve as a backup controller for LUN 3 370 and LUN 4 380, and RAID controller B 340 may serve as a backup controller for LUN 1 350 and LUN 2 360. In the event of a controller failure, an operable/functional controller may take ownership of the failed controller's LUNs. For example, if RAID controller A 330 fails, then RAID controller B 340 may become responsible for LUN 1 350 and LUN 2 360, which may allow the servers 310 to access the LUNs without interruption when one controller fails.

While an "active-standby" configuration provides a high level of availability, power efficiency of the storage network may be compromised. Some external storage systems may be designed to support a large range of client servers (e.g., 1 to 128 or more) and a large variation in the number of hard drives (e.g., 2 to 256 or more). Since some configurations may not approach the maximum configuration a storage system can support, a RAID controller may be underutilized. However, when RAID controller A 330 and RAID controller B 340 are underutilized, both controllers may still be powered for high availability. If both controllers are significantly underutilized, the storage system may be providing to power both controllers when one controller could manage the storage system sufficiently. Further, in periods of low controller utilization, high availability may not be a concern. As a result, a storage controller in a dual controller system may be placed in a low power state without detriment to the system when performance requirements allow a single controller to manage the system. In the case that the other controller fails or system demands increase, the controller in the low power state can be brought back online without interruption to client systems. While implementations providing dual storage controllers are discussed, other implementation may utilize multiple storage controllers.

Figure 4:
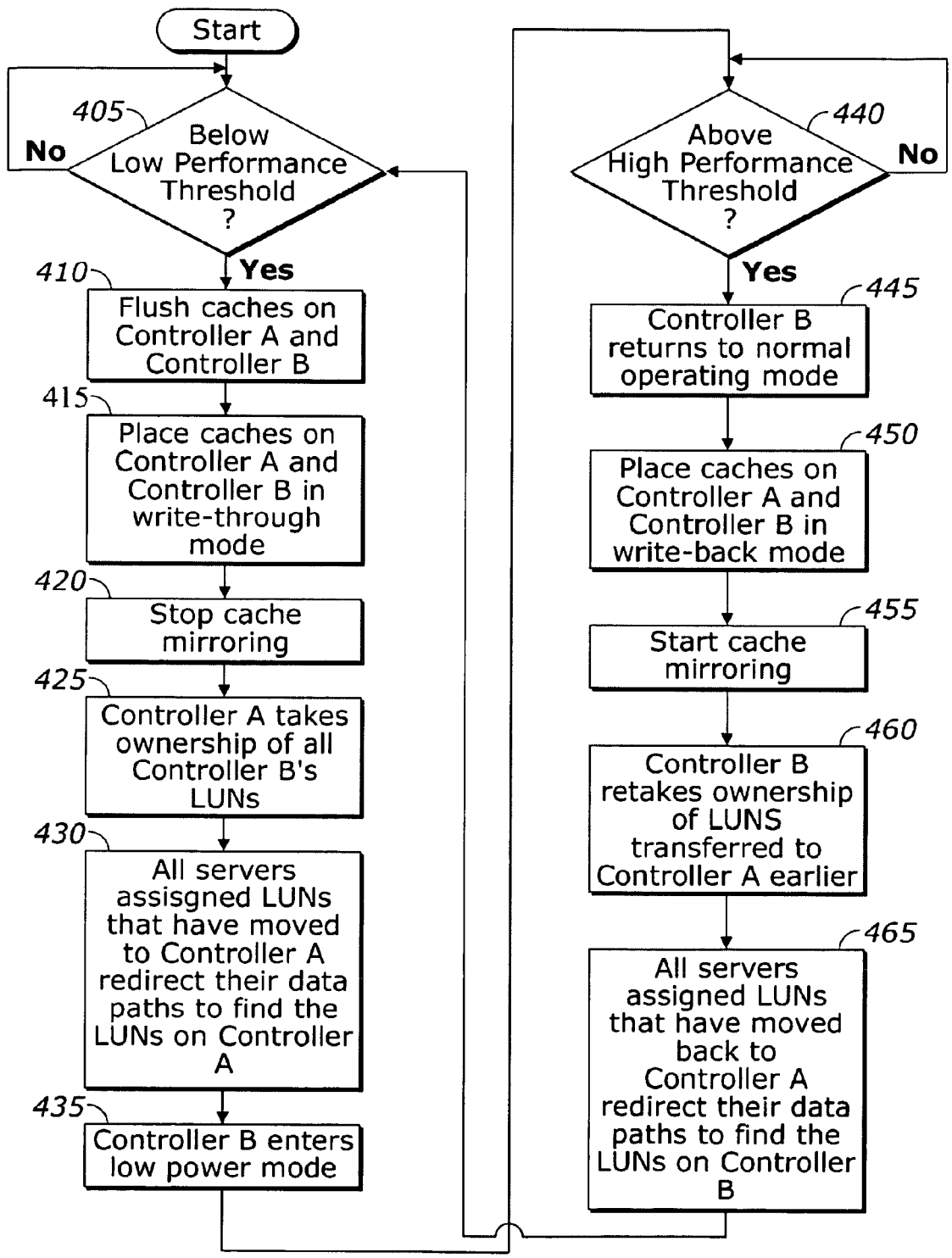
FIG. 4 represents a flowchart of a method for reducing power consumption in a storage system utilizing dual first controllers.

FIG. 4 represents a flowchart of a method for reducing power consumption in a storage system utilizing dual storage controllers. While implementations utilizing RAIDs are discussed herein, the present disclosure is in no way limited to RAIDs. In addition, the method discussed herein may be applied to systems utilizing more than two storage controllers as well. Any system utilizing multiple storage controllers may apply the techniques discussed herein to reduce power consumption, such as a system using just a bunch of disks (JBODs) or the like. Further, various methods are contemplated including all or less than all of the steps described herein and/or mentioned below, any number of repeats or any of the steps shown and/or mentioned below, and performance of the steps in any order.

When the method first begins, a storage system may operate at full performance capacity or both storage controllers may operate in normal operating mode. In a normal operating mode, a storage controller may be fully powered and may actively manage at least one LUN and may be a standby controller for at least one other LUN. The storage controllers may constantly monitor performance characteristics and may also communicate the performance data to each other if desired. Performance characteristics may include the I/O per second, average queue depth (i.e., number of commands queued by a controller), average response time, or any other suitable performance characteristics. A performance threshold may be set in the storage system that indicates when a controller may be placed in a low power mode or normal mode. The performance threshold may indicate a performance level, below which, only one controller is required to satisfy the performance requirements of a storage system or it may indicate a level, above which, two controllers are needed. An administrator may define performance thresholds lower or higher if desired.

In step 405, the storage system may check if the performance characteristics fall below a low performance threshold. A low performance threshold may be set at a predetermined value for performance characteristic(s) that indicates when a single controller may manage the demands of the storage system. When performance characteristics of the storage system fall below the predetermined value, one controller may be capable of managing the demands of the entire system. If the performance characteristics do not fall below the low performance threshold, then the check in step 405 may be repeated. If performance characteristics fall below the low performance threshold, the caches of controller A and B may be flushed in step 410. A cache flush operation may cause data stored in a cache memory of a controller that has not previously been stored to be sent to logical drives. In step 415, caches on controller A and controller B may be placed into a write-through mode. In a write-through mode, each write to a cache may cause a corresponding write to the logical drives. Prior to switching the controller to a write-through mode, the controller may be in a write-back mode where data written to a cache is not immediately written to a logical drive. The data in the cache may be held temporarily and is not written to the logical drive until necessary. Next, cache mirroring in the controllers may be stopped in step 420. Cache mirroring copies data in the cache of a first controller to the cache of a second controller, which may provide fast and reliable access to data. Further, controller A may take ownership of all of the LUNs of controller B (e.g., LUNs 3 and 4) in step 425. Because controller B is to be switched to a low power mode, controller A may need to manage the LUNs of controller B. Since the ownership of LUNs previously assigned to controller B may have changed, the servers assigned to these LUNs may have their data paths redirected to find the LUNs on controller A in step 430. For instance, the features of a multipathing driver may be utilized to modify a data path for a LUN. Once the above steps have been performed, controller B may enter a low power mode in step 435. A low power mode may provide an operational mode for a controller in which power consumption of the controller is reduced in comparison to a normal operating mode. Any number of low power schemes may be implemented depending on the type of storage system, such as: (1) throttling the clock speed to a minimum level on controllers that have standard processors, (2) placing a processor or system memory in a sleep or low power mode, (3) shutting down input/output physical interfaces (I/O PHYS) of the controller, (4) shutting down cores of a multicore processor, (5) powering down the cache of a controller, or (6) implementing any other suitable low power techniques. In some cases, the method utilized to reduce power consumption may be dependent on the controller's capabilities. For instance, some controllers may be capable of placing a processor or memory in a suspended state or shutting down interfaces.

One of the aspects of the low power state is that a controller may be brought back online without an interruption of service if another controller fails. As in the normal operating mode when both controllers are operating at normal power, the system may also monitor performance when one controller is in a low power state. In step 440, a check may be performed to determine if the performance characteristics of the storage system are above a high performance threshold. A high performance threshold may be set at a predetermined value for performance characteristics that indicates when both controllers may be need to manage the demands of the storage system. When performance characteristics of the storage system are above the predetermined value, both controllers may be placed in a normal operating mode.

Because power up times from a low power mode to a normal mode for different controllers and system setups may vary, the values of the low and high performance thresholds may be system dependent. For each system, the performance thresholds may be defined in a manner that allows a controller to be brought online without interruption to a client system. Further, the low and high performance thresholds may be defined or adjusted by an administrator or the like. The value of low and high performance thresholds may be based on the value of a single performance characteristic or the value of several performance characteristics. In one implementation, a performance threshold may include several individual values for multiple performance characteristics. In another implementation, the value of each of the performance characteristic may be scaled to determine a composite value for the performance threshold. Further, hysteresis may be utilized to prevent thrashing, such as slightly overlapping or gapping the value of the low performance threshold and the high performance threshold to prevent repeated switching of a controller between a low power mode and a normal operating mode. For instance, the value of the low performance threshold may be slightly lower than the high performance threshold to prevent being repeatedly switched back-and-forth between the modes when slight fluctuations in the performance characteristics occur near the performance threshold. In another implementation, the low performance threshold and the high performance threshold may have the same value. However, the performance characteristics may need to be below the low performance threshold or above the high performance threshold for a predetermined period of time before the operating mode is switched to prevent rapid switching back-and-forth between modes.

If the performance characteristics are below a high performance threshold, the check in step 440 may be repeated. If the performance characteristics are above the high performance threshold, controller B may return to a normal operating mode in step 445. Next, both controllers may be placed in a write-back mode in step 450. Further, cache mirroring may be started in step 455. The ownership of the LUNs (e.g., LUNs 3 and 4), which were previously transferred to controller A, may be assigned to controller B again in step 460. In step 465, the data paths of LUNs that have been reassigned in step 460 may be redirected to find the LUNs on controller B. Once the steps placing both controllers in a full power mode have been completed, the storage system may return to step 405 to repeat the process.

As discussed previously, another implementation of an IHS may provide multiple storage controllers. In order to reduce power consumption in a multiple controller system, one or more of the storage controllers may be placed into a low power mode. As in the method discussed above, a multiple controller system may require similar operations to be performed when switching between different modes, such as flushing controller caches, changing cache modes the controllers, reassigning ownership of LUNs, and other operations may need to be performed. In one implementation, the multiple controllers may allow several low and high performance thresholds to be used to provide multiple power modes. For instance, in a system providing four storage controllers, four different power modes may be provided, such as a normal power mode and three additional reduced power modes. As the performance characteristics fall below each of three different performance thresholds, one additional controller may be placed in a low power mode. As the performance characteristics rise above each of the performance thresholds, each of the controllers in a low power mode may be switched back into a normal operating mode until all controllers are in a normal power mode. In other implementations, the multiple controllers may provide multiple power modes that switch more than one controller into a low power mode.

By allowing one or more of the controllers in a multiple controller system to be switched to a low power mode when utilization is low, less power may be consumed by the storage system. By switching the controllers back to a normal operating mode when system utilization increases, any interruption to client systems may be avoided. Utilizing these techniques, a multiple controller system may provide the desired high availability of multiple controller systems with lower power consumption.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

Furthermore, methods of the present disclosure, detailed description and claims may be presented in terms of logic, modules (e.g., performance adjustment module), software or software implemented aspects typically encoded on a variety of non-transitory storage media or storage medium including, but not limited to, computer-readable storage medium/media, machine-readable storage medium/media, program storage medium/media or computer program product. Such storage media, having computer-executable instructions stored thereon, may be handled, read, sensed and/or interpreted by an information handling system, such as a computer. Generally, computer-executable instructions, such as program modules, may include routines, programs, objects, components, data structures, and the like, which perform particular tasks, carry out particular methods or implement particular abstract data types. Those skilled in the art will appreciate that such storage media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

What is claimed is:

1. A method for conserving power in an information handling system (IHS) which includes storage systems with more than one controller, the method comprising:
   assigning sets of logical unit numbers (LUNs) to each of the controllers and operating the controllers in normal power mode;
   monitoring an average queue depth of the controllers;
   determining if the average queue depth of the controllers is below a given performance threshold;
   switching one controller into a low power mode if the average queue depth is below the given performance threshold, wherein at least one second controller remains in a normal power mode; and
   reassigning the set of logical unit numbers (LUNs) assigned to the one controller to the at least one second controller.

2. The method of claim 1, wherein the one controller and the at least one second controller are selected from the group consisting of RAID controllers, disk controllers, and tape library controller.

3. The method of claim 1, wherein switching the one controller into the low power mode is selected from the group consisting of throttling a clock of the at least one first controller to a minimum level, placing system memory in a low power mode, placing a processor in a sleep mode, shutting down physical interfaces of the at least one first controller, shutting down one or more cores of a multicore processor, powering down a cache of the at least one first controller, and a combination thereof.

4. The method of claim 1, further comprising:
determining if the average queue depth is below the given performance threshold for a predetermined period of time before switching the one first controller into the low power mode.

5. The method of claim 4 further comprising:
determining if the average queue depth is above a second given performance threshold; and
switching the one controller back into a normal power mode if the average queue depth is above the second given performance threshold.

6. The method of claim 5 further comprising:
placing a first set of caches and a second set of caches into a write-back mode when the one controller is placed in the normal power mode;
starting cache mirroring in the one controller and the at least one second controller; and
transferring control of a set of LUNs to the one controller.

7. A computer-readable storage medium having computer-executable instructions for performing a method for conserving power in an information handling system (IHS) having at least two controllers to manage storage systems, the method comprising:
assigning sets of logical unit numbers (LUNs) to each of the controllers and operating the controllers in normal power mode;
monitoring an average queue depth of the controllers;
determining if the average queue depth is below a predetermined low performance threshold;
switching at least one first controller into a low power mode if the average queue depth is below the low performance threshold, wherein at least one second controller remains a normal power mode; and
reassigning a first set of logical unit numbers (LUNs) to the at least one second controller when switching the at least one first controller into a low power mode.

8. The computer-readable storage medium of claim 7, wherein the at least one first controller and the at least one second controller are selected from the group consisting of RAID controllers, disk controllers, and tape library controller and the controllers effect the monitoring.

9. The computer-readable storage medium of claim 7, wherein switching the at least one first controller into the low power mode is selected from the group consisting of throttling a clock of the at least one first controller to a minimum level, placing system memory in a low power mode, placing a processor in a sleep mode, shutting down physical interfaces of the at least one first controller, shutting down one or more core of a multicore processor, powering down a cache of the at least one first controller, and a combination thereof.

10. The computer-readable storage medium of claim 7, further comprising determining if the average queue depth is below the low performance threshold for a predetermined period of time before switching the at least one first controller into the low power mode.

11. The computer-readable storage medium of claim 10 further comprising:
determining if the average queue depth is above a predetermined high performance threshold; and
switching the at least one first controller into a normal power mode if the average queue depth is above the high performance threshold.

12. The computer-readable storage medium of claim 11 further comprising:
placing a first set of caches and a second set of caches into a write-back mode when the at least one first controller is placed in the low power mode; and
starting cache mirroring in the at least one first controller and the at least one second controller.

13. An information handling system (IHS), having more than one controller to manage storage systems, for reducing power consumption, the system comprising:
a plurality of disks;
at least one first controller in communication with the plurality of disks and having a first set of logical unit numbers (LUNs) assigned to it, wherein the IHS monitors an average queue depth for the controllers and determines if the average queue depth is below a predetermined low performance threshold, and the at least one first controller is switched into a low power mode if the average queue depth is below the low performance threshold; and
at least one second controller in communication with the plurality of disks, wherein the first set of logical unit numbers (LUNs) are reassigned to the at least one second controller when the at least one first controller is switched into, a low power mode.

14. The system of claim 13, wherein the at least one first controller and the at least one second controller are selected from the group consisting of RAID controllers, disk controllers, and tape library controller.

15. The system of claim 13, further comprising determining if the average queue depth is below the low performance threshold for a predetermined period of time before switching the at least one first controller into the low power mode.

16. The system of claim 13, wherein the low power mode is selected from the group consisting of a clock of the at least one first controller throttled to a minimum level, system memory placed in a low power mode, a processor placed in a sleep mode, physical interfaces of the at least one first controller that are shut down, one or more cores of a multicore processor that is shut down, and a cache of the at least one first controller that is shut down.

17. The system of claim 13, wherein the IHS determines if the average queue depth is above a predetermined high performance threshold, and the at least one first controller is switched back into a normal power mode if the average queue depth is above the high performance threshold for a given period of time.

18. The method of claim 17, wherein when the at least one first controller is switched back into the normal power mode a first set of caches and a second set of caches are placed into a write-back mode, cache mirroring in the at least one first controller and the at least one second controller is started, and control of a set of LUNs is transferred to the at least one first controller.

* * * * *